United States Patent
Chase et al.

(10) Patent No.: US 6,526,824 B2
(45) Date of Patent: Mar. 4, 2003

(54) HIGH PURITY CHEMICAL CONTAINER WITH EXTERNAL LEVEL SENSOR AND LIQUID SUMP

(75) Inventors: Geoffrey L. Chase, Alburtis, PA (US); John Eric Baker, Temecula, CA (US); Lee Senecal, Vista, CA (US); Robert Sam Zorich, Carlsbad, CA (US); David Allen Roberts, Encinitas, CA (US)

(73) Assignee: Air Products and Chemicals, Inc., Allentown, PA (US)

( * ) Notice: Subject to any disclaimer, the term of this patent is extended or adjusted under 35 U.S.C. 154(b) by 49 days.

(21) Appl. No.: 09/876,243

(22) Filed: Jun. 7, 2001

(65) Prior Publication Data

US 2002/0184945 A1 Dec. 12, 2002

(51) Int. Cl.$^7$ .............................. B67C 3/00; G01F 23/28
(52) U.S. Cl. ...................... 73/290 V; 141/18; 141/198; 141/95
(58) Field of Search ........................ 73/290 V; 141/94, 141/95, 198, 374, 67, 64, 18; 222/394, 399, 400.7, 64

(56) References Cited

U.S. PATENT DOCUMENTS

| | | | |
|---|---|---|---|
| 3,100,885 A | * 8/1963 | Welkowitz et al. | ......... 340/621 |
| 4,053,085 A | 10/1977 | Brown et al. | ................ 220/378 |
| 4,440,319 A | 4/1984 | Nitchman et al. | .......... 222/378 |
| 4,580,448 A | * 4/1986 | Skrgatic | ..................... 367/908 |
| 4,770,038 A | * 9/1988 | Zuckerwar et al. | ......... 310/338 |
| 4,949,878 A | * 8/1990 | Jacobi | ......................... 220/265 |
| 5,199,603 A | 4/1993 | Prescott | .......................... 222/3 |
| 5,303,585 A | * 4/1994 | Lichte | ........................ 367/908 |
| 5,562,132 A | 10/1996 | Siegele et al. | ............. 141/198 |
| 5,663,503 A | 9/1997 | Dam et al. | ..................... 73/649 |
| 6,077,356 A | * 6/2000 | Bouchard | ..................... 118/715 |
| 6,202,484 B1 | * 3/2001 | Willner et al. | ............ 73/290 V |
| 6,264,064 B1 | * 7/2001 | Birtcher et al. | ................. 222/1 |
| 6,397,656 B1 | * 6/2002 | Yamaguchi et al. | ......... 73/1.82 |
| 2002/0108670 A1 | * 8/2002 | Baker et al. | .................. 141/18 |

FOREIGN PATENT DOCUMENTS

GB    GB2 259 508 A    * 3/1993

* cited by examiner

Primary Examiner—Hezron Williams
Assistant Examiner—Rose M. Miller
(74) Attorney, Agent, or Firm—Geoffrey L. Chase

(57) ABSTRACT

A container for high purity chemicals having an externally placed level sensor to avoid contamination of such chemical and for ready serviceability and a removeable liquid out diptube to facilitate cleaning during refilling or refurbishing, both of which are situated adjacent a sump in the bottom of the container. The container can have a valved inlet and outlet and can be constructed of stainless steel which is electropolished.

18 Claims, 2 Drawing Sheets

HIGH PURITY CHEMICAL CONTAINER WITH EXTERNAL LEVEL SENSOR AND LIQUID SUMP

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The electronic device fabrication industry requires various liquid chemicals as raw materials or precursors to fabricate integrated circuits and other electronic devices. This need arises from the requirement to dope semiconductors with various chemicals to provide the appropriate electrical properties in the semiconductor for transistors and gate oxides, as well as circuits requiring various metals, barrier layers, vias. Additionally, dielectric layers are needed for capacitors and interlayer dielectric requirements. Fabrication requiring subtractive technologies require resists, planarization chemistries and etchants.

All of the chemicals that are used in these applications are required in high purity conditions to meet the stringent requirements of the electronic fabrication industry imposed by the extremely fine line width and high device densities in current and future electronic devices being fabricated with those chemicals.

A part of the effort to provide high purity chemicals is the design and structure of the containers and systems which delivery such chemicals to the reactor or furnaces where the electronic devices are being fabricated. The purity of the chemicals can be no better than the containers in which they are stored and the systems through which they are dispensed.

In addition, it is important to monitor the quantity of high purity chemical available during its use in the electronic device fabrication process. Electronic devices are fabricated in quantities of several hundred at a time per semiconductor wafer, with the size of individual wafers being processed expected to be larger in future fabrication processes. This makes the value of the yield of electronic devices being processed on wafers very high, resulting in considerable cost if processing or fabrication occurs when the high purity chemical is unavailable inadvertently. Thus, the electronic fabrication industry has used monitoring of high purity chemical quantity a part of their scheme in their fabrication processes.

To address the issues of purity and monitoring of chemical quantity available for use, the industry has made various attempts to achieve those goals.

U.S. Pat. No. 5,199,603 discloses a container for organometallic compounds used in deposition systems wherein the container has inlet and outlet valves and a diptube for liquid chemical dispensing through the outlet. However, no level sensor is provided and the diptube terminates inside the container.

U.S. Pat. No. 5,562,132 describes a container for high purity chemicals with diptube outlet and internal float level sensor. The diptube is connected to the integral outlet valve. However, the diptube is not readily serviceable during refill or refurbishing of the container and the internal float level sensors are known particle generators for the high purity chemicals contained in the container.

U.S. Pat. No. 4,440,319 shows a container for beverages in which a diptube allows liquid dispensing based upon a pressurizing gas. The diptube may reside in a well to allow complete dispensing of the beverage. Level sense is not taught and the diptube is not readily removed or refurbished.

U.S. Pat. No. 4,053,085 discloses an arrangement for sealing a tube containing corrosive chemicals which uses two concentric washer seals of elastomeric materials. One seal is resilient and one is corrosion resistant. The use of metallic seals is not proposed.

U.S. Pat. No. 5,663,503 describes an ultrasonic sensor, which is known to be used to detect liquid presence in a vessel. Invasive and non-invasive sensors are described.

U.S. Pat. No. 6,077,356 shows a reagent supply vessel for chemical vapor deposition, which vessel has a sump cavity in which the liquid discharge dip tube terminates, as well as a liquid level sensor terminates. Ultrasonic sensors are contemplated (col. 6, line 37), but in that embodiment, the patent expressly teaches that the sensor does not utilize the sump for sensing operations (col. 6, line 38–43).

The shortcomings of the prior art in addressing the goals of purity and level sensing are overcome by the present invention, which provides high purity containment, ease of cleaning during refill or refurbishing and avoidance of contamination or particle generation during level sensing, level sensing with an external ultrasonic level sensor through a sump sized to accommodate a dip tube and a detection zone for the ultrasonic sensor, as well as avoidance of atmospheric contamination during any changeout or repair of the level sensing device. Other advantages of the present invention are also detailed below.

BRIEF SUMMARY OF THE INVENTION

The present invention is a container for high purity chemicals comprising a shell with an external surface comprising a top surface, a side surface and a bottom surface, an orifice capable of being used as an inlet, an orifice capable of being used as an outlet, an ultrasonic level sensor affixed to the external bottom surface of said shell for determining the amount of high purity chemical in the container and a diptube removably connected to the outlet through which high purity chemical can be dispensed from the container, a sump in the bottom surface into which a lower end of the diptube terminates, the sump sized to accommodate the lower end of the dip tube and a detection zone for the ultrasonic level sensor to determine the amount of high purity chemical in the sump, wherein the ultrasonic level sensor is positioned adjacent the sump to at least determine the amount of chemical in the sump.

Preferably, the ultrasonic level sensor is located on a bottom surface of the external surface of the container below the sump.

In another embodiment, the present invention is a container for high purity chemicals having a metallic shell, a valved inlet, a valved outlet, an ultrasonic level sensor removeably affixed to an external bottom surface of said shell for determining the amount of high purity chemical in the container and a diptube removably connected to the outlet through which high purity chemical can be dispensed from the container by connection to a downstream high purity chemical delivery system, a sump in the bottom surface into which a lower end of the diptube terminates, the sump sized to accommodate the lower end of the dip tube and a detection zone for the ultrasonic level sensor to determine the amount of high purity chemical in the sump, the ultrasonic level sensor positioned below a portion of the sump unoccupied by the diptube.

Preferably, the level sensor is located below a portion of said sump and which is not below the diptube.

Preferably, the sump is sized to accommodate the lower end of the diptube and a detection zone for the ultrasonic level sensor that is of sufficient size to avoid level sensing interference of the diptube by the level sensor.

Preferably, the sump is below the plane of said bottom surface and comprises a portion of said bottom surface.

The present invention is also a method for determining the level of high purity chemical in a container of high purity chemical having a metallic shell with an external surface comprising a top surface, a side surface and a bottom surface, a valved inlet, a valved outlet, an ultrasonic level sensor affixed to the external bottom surface of the shell for determining the amount of high purity chemical in the container and a diptube connected to the outlet through which high purity chemical can be dispensed from the container, a sump in the bottom surface into which a lower end of the diptube terminates, comprising; positioning the ultrasonic level sensor below the sump, generating ultrasonic waves in the high purity chemical in the container, sensing the reflection of the generated ultrasonic waves by the sensor, and generating a signal proportional to the reflection.

DETAILED DESCRIPTION OF THE INVENTION

Figure 1A:
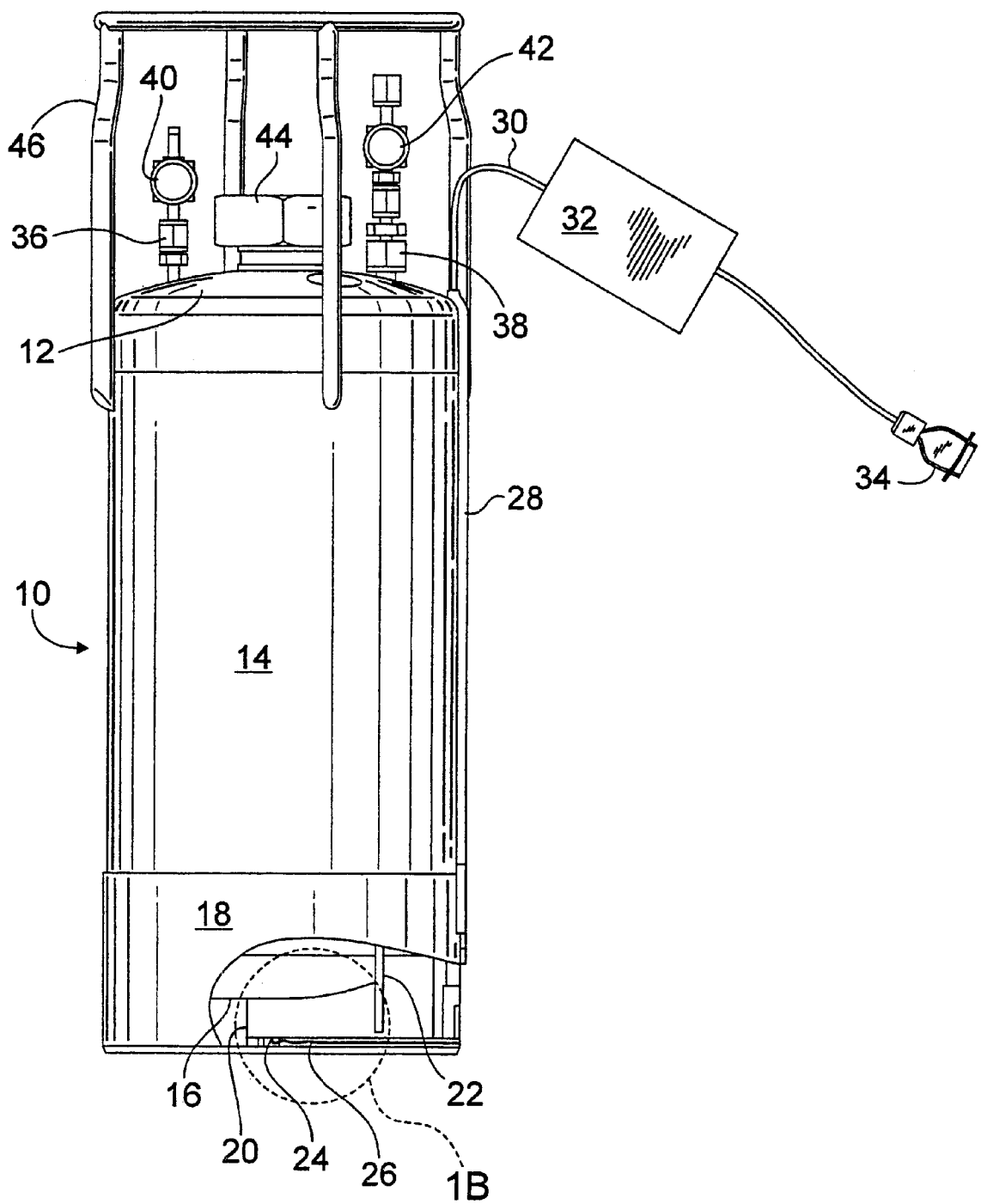
FIG. 1A is a schematic plan view of a container outfitted in accordance with one embodiment of the present invention with a partial section showing a bottom surface and sump.

The present invention is directed to a container for high purity chemical, such as is required in fabrication of semiconductor devices, flat panel displays and electronic devices. Such fabrication typically requires high purity raw materials or chemical precursors. High purity in this context typically is above 99.9 wt. %, frequently at least 99.999 wt. % and most recently at least 99.9999 wt. % pure. To maintain such purity in containers of high purity chemicals, such as liquid chemicals of the class of tetraethylorthosilicate (TEOS), containers must be designed for exacting purity and inertness. Several parameters are appropriate, including electropolished internal surfaces of high purity chemical wetted surfaces, inert materials of construction, such as stainless steel (316L) or quartz (depending on the chemical), absence of moving parts in the container, excellent inert seals, and ready accessibility of the container and its hardware during refilling and/or refurbishing.

Typically, high purity chemicals are today more frequently being delivered from on-site storage to the point of use at the furnace or tool, where they are utilized in a liquid state, to be vaporized or volatilized at the furnace or tool. This allows for greater throughput and more concise dispensing. One of the methods by which chemical is delivered from a container has been to use a diptube which is disposed in the chemical in the container. By applying a pressure to the head space of the container above the liquid level, the chemical is then expelled through the diptube out of the container into a secondary device. Alternatively, the diptube can be used to dispense an inert carrier gas into the liquid chemical to bubble and entrain the chemical into the gas for removal through an outlet above the level of the liquid chemical, resulting in gas phase delivery from the container. Such containers are known in the industry as bubblers.

This diptube has been a source of particle contamination in the past, because it is difficult to clean during the processing of containers to be filled with chemical. In the present invention, the diptube can be designed to be removable from the container by utilizing a combination of an elastomer seal and a metal seal and/or a metal seal only. The diptube will be sealed into the container via an elastomer O-ring or a metal seal, allowing chemical transfer through the tube and out of the container. In addition, the dip tube will be sealed against environmental contamination via an all metal seal. By making it removable from the container, the diptube can then be cleaned much more thoroughly. Not only does this allow for more thorough cleaning during container processing, it also allows secondary devices to be added to the diptube, such as a removable filter. It will also allow for alternate materials to be used for the diptube. This has application in a non-corrosive, all metal, coated container.

A non-intrusive level sensor that is attached to a non-wetted, permanent part of the container is also contemplated by the present invention. By "a non-wetted, permanent part of the container", the present invention refers to the level sensor being attached to a fixed, external surface or location on the container. The sensor would be attached one of two ways, permanently or so it is completely removable. By "completely removable", the present invention contemplates a level sensor that can be removed from the container without compromising the integrity of the chemical or the container. Attaching the level sensor to a non-wetted external surface part of the container increases the integrity of the chemical. Making the level sensor removable from the container allows for easy replacement in the field if the level sensor does fail.

In the various embodiments of the present invention, specific locations and attachment techniques are described for the externally located ultrasonic level sensor and the diptube. However, this present invention contemplates a removable chemical delivery piping or pressurizing gas inlet for bubbler or vapor delivery ("diptube"), and this may be installed in a number of equivalent fashions: a) from above the liquid level of the high purity chemical on the top surface of the container; b) from above the liquid level of the high purity chemical on the side surface of the container; c) from below the liquid level of the high purity chemical on the side surface of the container; d) from below the liquid level of the high purity chemical on the bottom surface of the container. Such top, side and bottom surfaces of the container constitute the external shell of the container. In some instances, the interface or intersecting seams of the various surfaces may be non-distinct, such as where the container has a generally spherical shape or the top and bottom surface represent a smooth curve continuation of the side surface or sidewall. However, the top surface is generally considered to be the area of the external surface which is at the highest point of the external surface of the container when it is in its normal service position. The bottom surface is the lowest most point of the external surface of the container when the container is in its normal service position. This excludes container skirts and chime rings. The external surfaces of the container are the outside non-wetted surfaces of the external shell. All such variations and combinations are appropriate to meet the objectives of the present invention for high purity service, ease of cleaning and refurbishing and when liquid delivery is contemplated, removal of substantially all of the content of a high purity chemical container.

The containers contemplated by the present invention include containers that directly feed the furnace or tool of an electronic device fabrication furnace or tool where the chemical is actually used, sometimes referred to as an ampoule, canister or process container; and also to containers which refill such earlier described container, sometimes referred to as bulk containers. The containers can be of any practical size, including from one or more liters to five or more liters. The size of the container is not critical. The piping or valved manifolds which deliver chemical to or from the containers are well known in the industry and are not described further, but they are typically referred to as chemical delivery systems and include, in addition to piping and valved manifolds, sources of pressurized inert gas (carrier or push gas), an automated control unit, source of pneumatic air to operate pneumatic valves, vent lines, purge lines, sources of vacuum, flow control and monitoring hardware and other attendent devices, which are not the topic of the present invention.

Chemicals that can be contained in the containers of the present invention may include: tetraethylorthosilicate (TEOS), borazine, aluminum trisec-butoxide, carbon tetrachloride, trichloroethanes, chloroform, trimethylphosphite, dichloroethylenes, trimethylborate, dichloromethane, titanium n-butoxide, dialkylsilane, diethylsilane, dibutylsilane, alkylsilanehydrides, hexafluoroacetylacetonatocopper(1)trimethylvinylsilane, isopropoxide, triethylphoshate, silicon tetrachloride, tantalum ethoxide, tetrakis(diethylamido)titanium, tetrakis (dimethylamido)titanium, bis-tertiarybutylamido silane, triethylborate, titanium tetrachloride, trimethylphosphate, trimethylorthosilicate, titanium ethoxide, tetramethyl-cyclotetrasiloxane, titanium n-propoxide, tris(trimethylsiloxy) boron, titanium isobutoxide, tris(trimethylsilyl)phosphate, 1,1,1,5,5,5-hexafluoro-2,4-pentanedione, tetramethylsilane, 1,3,5,7-tetramethylcyclotetrasiloxane and mixtures thereof.

These chemicals are in most instances are relatively expensive and users desire to use as much of the chemical as possible without running out of chemical and shutting down the process consuming the chemicals. Electronic device fabrication uses expensive tool sets and creates expensive, value-added wafers with a large number of discrete integrated circuits per wafer. It is important to use as much of the chemical precursors as possible to save on the cost of the integrated circuit, but at the same time, it is expensive to shut the wafer processing tool sets or produce defective integrated circuits.

Therefore, it is desireable to use an external ultrasonic level sense to sense liquid chemical level to avoid contamination of the chemical by the sensor and to facilitate sensor changeout without effecting the quality of the chemical.

It is further desireable to locate the external ultrasonic level sensor below a sump in the bottom wall of the container so that the sensor can measure very small amounts of consumable chemical for nearly complete utilization of those chemicals.

By using an external ultrasonic level sensor below a sump, valid detections are excentuated by the column of liquid that forms in the sump at near full utilization of the chemical. In contrast, without such a sump, the sensor would be analyzing a signal in a very shallow but significantly greater volume of residual chemical.

Therefore, a significant aspect of the present invention is the combination of an external ultrasonic level sensor positioned to detect liquid level in a container ultimately detecting residual chemical in a sump in the container which allows for accurate signals of chemical level in very small residual chemical volumes in the sump.

To achieve that goal, the present invention provides a container with a sump adequate to accommodate the sensing function of the external ultrasonic level sensor and the lower end of a diptube for withdrawing chemical from the container. The sump must be sized adequately to not have the diptube interfere with the signals that the ultrasonic level sensor is generating and sensing in the liquid chemical in the sump.

The external ultrasonic level sensor operates by generating ultrasonic waves up through the bottom wall of the container, into the liquid and reflecting a portion of the waves off the surface of the liquid chemical. The reflected ultrasonic waves are detected by the sensor and the time it takes the detection of the generated ultrasonic waves is proportional to the level of the liquid. Providing a sump excentuates the valid signal sensing by providing a larger column of liquid and thus a greater delta time interval to sense liquid level, yet on a smaller volume of liquid than a container that does not have a sump or a container that does not use its sump for the ultrasonic level sensing function, such as U.S. Pat. No. 6,077,356, which specifically teaches away from such a combination.

By sizing the sump to provide a detection zone for the sensor and a withdrawal zone for the diptube, the present invention provides the most accurate environment for level sensing to very small quantities of residual expensive chemical while allowing that residual chemical to be consumed by removal through the diptube terminating in the sump.

Various sump geometries are contemplated to accommodate both the detection zone and the diptube withdrawal zone. In the illustrated embodiment, the sump is cross-sectionally one half of the circle defined by the side wall of the container. Its bottom surface is approximately an inch below the bottom wall of the container, which bottom wall in this embodiment constitutes a generally smooth concave curving horizontal surface. Other sump geometries are contemplated including horizontally circular cavities in the bottom wall, lower points in the bottom wall of the container, horizontally oval cavities, and horizontally dog-bone shaped cavities. It is possible to use a bottom wall which is generally convex upward so that a continuous annular sump exists at the intersection of the bottom wall with the side wall of the container. In the latter situation, the diptube and the ultrasonic sensor could be placed diametrically opposite one another so as to have the greatest avoidance of any potential interference with the sensing of the sensor of the chemical level and the presence of the diptube, which could give a false reading of the chemical level.

The size of the detection zone of the sump and the withdrawal zone of the sump is dependent on the generation and detection parameters of the external ultrasonic level sensor. The detection zone must be sufficiently large so that the reflected ultrasonic waves from the diptube do not cause significant interference with the reflected ultrasonic waves from the surface of the liquid in the container and especially the surface of the liquid residually left in the sump after chemical is emptied from the container above the sump. This will be effected by the placement of the diptube in the sump and its proximity to the detection zone and the bottom wall of the sump. This in turn is effected by the space at the top of the container to which the diptube is attached and the attachment configuration.

Attachment of a diptube to the container of the present invention can be accomplished by several contemplated methods. The diptube is connected to the outlet by one of: a metal to metal seal using a VCR® gland; an elastomeric seal between an outer wall of the dip tube and an inner diameter of the outlet of the container; and, a metal to metal seal of the outlet and a flange on the diptube or other known connection devices for connecting a pipe to an outlet in the process chemistry industry.

In the versions of diptube sealing above, the 0-ring seals are used with the diptube to allow chemical to flow from the container, through the diptube, out of the outlet and outlet valve when a pressure is applied to the container head space through the inlet and inlet valve using an inert pressurizing gas, such as nitrogen or helium. The metal gasket seals out any contamination from the environment. Removable diptube attachment enhances the ability to clean or replace the diptube for high purity chemical service in the electronic fabrication industry. In addition, a removable diptube facilitates the use of additional high purity options, such as the placement of filters, getters, membranes, dosing dispensers and similar devices which may need service or replacement over the life of the container.

In these described embodiments, all components are manufactured from suitable metallic and non-metallic, compatible materials. In general, depending on the chemical in the container, this can include, but is not limited to, stainless steel (electropolished 316L), nickel, chromium, copper, glass, quartz, Teflon®, hastelloy, Vespel®, alumina, Kel-F, PEEK, Kynar®, silicon carbide or any other metallic, plastic or ceramic material, and variations and combinations are contemplated.

Figure 1B:
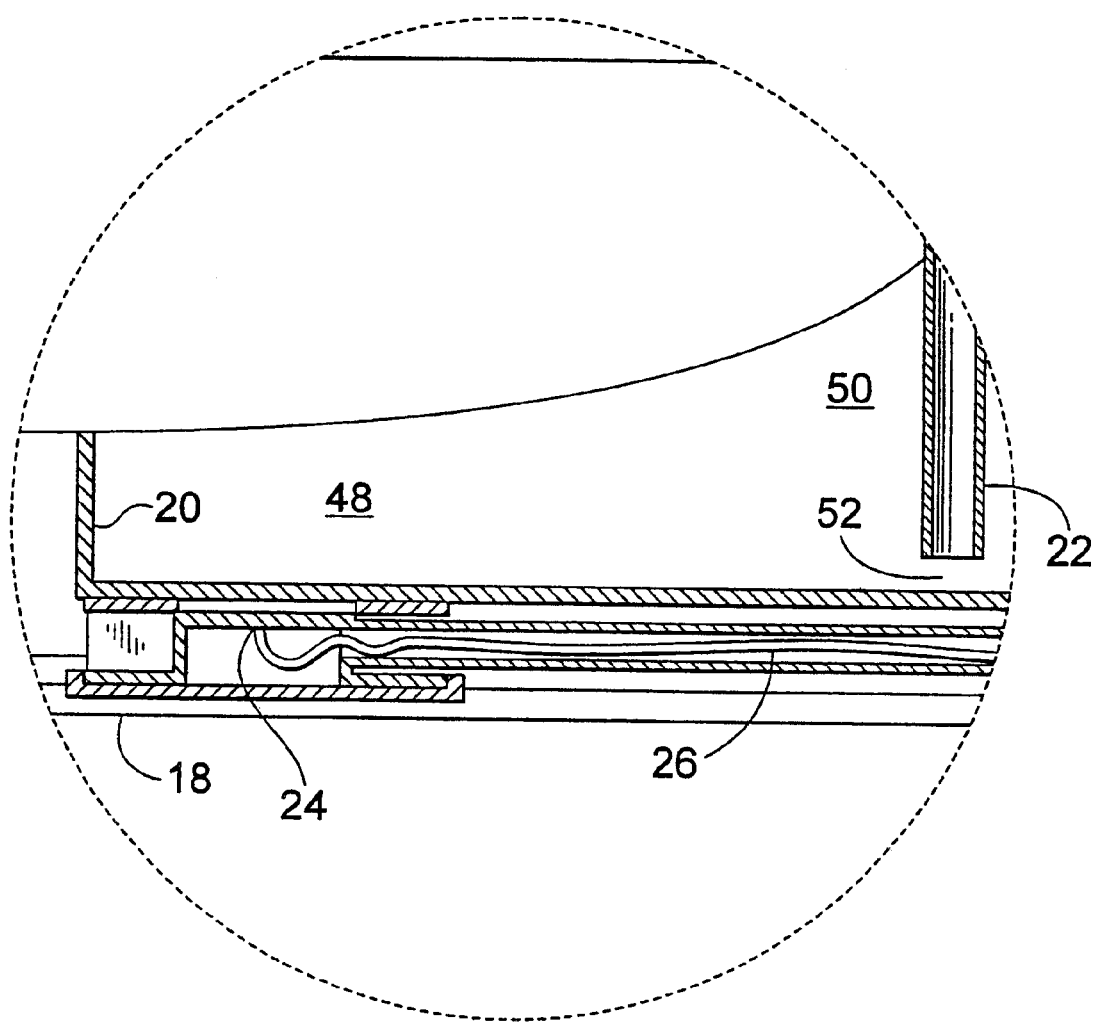
FIG. 1B is the partial section of FIG. 1 showing a sump and an external ultrasonic level sense positioned a spaced distance from a diptube.

In FIG. 1, a container 10, with a side surface or wall 14, a bottom or bottom surface 16 (in partial section) inside skirt 18 and attached to the lower or lowest most circumferential edge of side surface 14, a top or top surface 12, a chime ring assembly 46 for manually handling the container and protecting the valve and inlet/outlet orifices, an inlet pneumatic valve 40 connected to an inlet orifice 36 (valved inlet) typically connected to a source of inert pressurized gas (i.e., nitrogen, helium) to pressurize the headspace above the liquid level of the high purity liquid chemical to drive chemical out the diptube, an outlet orifice 38 with a removable diptube 22 (in this instance Teflon or similar inert plastic). The Teflon diptube is removable from the container and disposable so that a new diptube can be used during refurbishing of the same material or a different material. The diptube 22 has one end near outlet 38 and an other end which ends very near the bottom of the container sump 20, shown in greater detail in FIG. 1B, so as, to remove most of the liquid high purity chemical during pressurization of the liquid's headspace.

The present invention's level sensor 24 can view the high purity chemical in the container 10 through the bottom surface of sump 20. Preferably, the bottom surface 16 of the external surface of the container 10 has a generally concave downward curvature from said side surface 14, and the sensor 24 is located at the lowest most point of the bottom surface 16, which is the detection zone 48 of the sump 20, so as to read the liquid level to the lowest fill of liquid chemical in the container. This placement offers unique advantages because the sensor 24 is protected by the skirt 18 below the bottom surface 16, which skirt 18 is a continuation of side wall 14 below the bottom surface 16. The skirt 18 and the bottom surface 16 form a protected cavity in which the sensor 24 can safely reside, isolated from external disturbance and in a position to avoid mishandling during trans-port. Preferably, sensor 24 would not project below the plane representing the lowest most circumferential edge of the skirt 18, so as to avoid contact with any surface the container 10 may be placed upon. This placement also provides the best performance of the ultrasonic level sensor 24 to sense the level of the liquid chemical contained in the container 10 and its sump 20, because the sound waves pass through the liquid to the interface of the liquid chemical and the gaseous headspace to reflect off the interface and be sensed upon reflection to the sensor 24. Liquid is a better conductor of sound waves than gas, so this placement affords the most precision and accuracy for an ultrasonic level sensor 24 to sense liquid level from an external surface of a container 10.

The ultrasonic signal is transmitted through the container and bounced off the surface or interface of the liquid high purity chemical and the gaseous headspace above the liquid surface in the container 10. The level is based on the speed of sound in the gas and/or liquid chemical. The signal would be adjustable for different blanket gases used. Appropriate ultrasonic level sensors are available commercially, such as the ML101 from Cosense, Inc. located at 155 Ricefield Lane, Hauppage, N.Y. 11788. The sensor signal is transmitted through its connector wire 26, up the side wall 14 of container 10 through a protective shroud 28 to cable 30 connecting to appropriate process electronics 32 for amplifying or modulating the signal, and final to a connector 34 for connection and transmission of the sensor signal to any process controller the container may be operating with.

The container has a standard chime ring 46 which facilitates carrying as well as protecting outlet 38, inlet 36, pneumatic valves 40 and 42 and fill port 44, all situated on top surface or wall 12.

In FIG. 1B, the sump 20 is shown in enlarged detail. The sump can be seen to include a detection zone 48 unoccupied by the diptube 22 and a withdrawal zone 50 where liquid chemical is withdrawn by nearby diptube 22 occupying that portion of the sump 20, which is terminated very close to the bottom surface of the sump 20 by a distance 52 sufficient to use most of the residual chemical in the sump 20 without drawing any particulates into the diptube that would otherwise collect in the bottom of the sump. The distance 52 could be 0.5 to 1.0 cm, but the actual distance is dependent on the need for utilization of the chemical contained in the container.

Although the present invention has been illustrated and explained with regard to a particular embodiment, it is understood that other embodiments and variations are possible, such as additional inlets or outlets, valves that are operated by electrical solenoids, manual valves, hydraulic valves and the like. The features of this invention can be used on bulk chemical delivery containers which refill downstream containers, direct delivery ampoules, both with vapor delivery, i.e., bubblers and direct liquid injection ("DLI").

The present invention affords some significant advantages over the prior art in high purity chemical storage and dispensing. The ultrasonic level sensor is a continuous sensing device, providing specific liquid chemical level detail at all levels, but it can also be discrete in nature, providing data only at levels predetermined by appropriate input of setpoints, programming or electrical monitoring. It is also completely outside the container. This non-intrusive level sensor will allow for higher chemical purity, because it removes one more source of contamination. Also, making the level sensor completely removable from the container will allow replacement of the level sensor in the field if the level sensor fails whether the container is inservice or not. Most significantly, providing a sump to allow nearly complete utilization of the liquid chemical product and to enhance the accuracy of the level sensor provides a significant advantage over the prior art. Sizing the sump to accommodate not only the diptube, but also the sensing function of the sensor provides significant performance over the prior art. It is important to use the sump not only for liquid chemical withdrawal, but also to enhance signal accuracy for the sensor. To accomplish that, the sump must be sized to accommodate a detection zone reserved for the signals generated and received by the sensor, as well as a withdrawal zone for removing liquid chemical through the diptube.

The present invention has been set forth with regard to several preferred embodiments, however the full scope of the present invention should be ascertained by the claims which follow.

What is claimed is:

1. A container for high purity chemicals comprising a shell with an external surface comprising a top surface, a side surface and a bottom surface, at least one orifice capable of being used as an inlet, at least one orifice capable of being used as an outlet, an ultrasonic level sensor affixed to the external bottom surface of said shell for determining the amount of high purity chemical in said container and a diptube connected to one of said orifices through which high purity chemical can be dispensed from said container or pressurized gas can be delivered to the container to dispensed chemical, a sump in said bottom surface into which a lower end of said diptube terminates, said sump sized to accommodate said lower end of said dip tube and a detection zone for said ultrasonic level sensor to determine the amount of high purity chemical in said sump, wherein said ultrasonic level sensor is positioned adjacent said sump to at least determine the amount of chemical in said sump.

2. The container of claim 1 wherein said orifice capable of being used as an inlet and said orifice capable of being used as an outlet each have a valve for controlling fluid flow through said orifices.

3. The container of claim 2 wherein said valves are pneumatic valves capable of being operated by remote automated control.

4. The container of claim 1 wherein said diptube is removeably attached to said orifice capable of being used as an outlet at one end of said diptube and another end of said diptube ends near a bottom inside surface of said sump.

5. The container of claim 1 wherein said ultrasonic level sensor is located on a bottom surface of said external surface of said container below said sump.

6. The container of claim 5 wherein said ultrasonic level sensor is located below said sump and adjacent said diptube.

7. The container of claim 1 wherein said level sensor is removably attached to said external surface of said container.

8. The container of claim 1 wherein said level sensor is permanently attached to said external surface of said container.

9. A container for high purity chemicals having a metallic shell, a valved inlet, a valved outlet, an ultrasonic level sensor removeably affixed to an external bottom surface of said shell for determining the amount of high purity chemical in said container and a diptube removably connected to said outlet through which high purity chemical can be dispensed from said container by connection to a downstream high purity chemical delivery system, a sump in said bottom surface into which a lower end of said diptube terminates, said sump sized to accommodate said lower end of said dip tube and a detection zone for said ultrasonic level sensor to determine the amount of high purity chemical in said sump, said ultrasonic level sensor positioned below a portion of said sump unoccupied by said diptube.

10. The container of claim 9 wherein said level sensor is located below a portion of said sump and which is not below said diptube.

11. The container of claim 9 wherein said sump is sized to accommodate said lower end of said diptube and a detection zone for said ultrasonic level sensor that is of sufficient size to avoid level sensing interference of said diptube by said level sensor.

12. A container for high purity chemicals comprising a metallic shell with an external surface comprising a top surface, a side surface and a bottom surface, a valved inlet, a valved outlet, an ultrasonic level sensor removeably affixed to the external bottom surface of said shell radially inside a skirt of said container and located above the plane defined by the bottom circumferential lower edge of said skirt, for determining the amount of high purity chemical in said container and a diptube removably connected to said outlet through which high purity chemical can be dispensed from said container by connection to a downstream high purity chemical delivery system, a sump in said bottom surface into which a lower end of said diptube terminates, said sump sized to accommodate said lower end of said dip tube and a detection zone for said ultrasonic level sensor to determine the amount of high purity chemical in said sump, said ultrasonic level sensor positioned below a portion of said sump unoccupied by said diptube.

13. The container of claim 12 wherein said sump is below the plane of said bottom surface and comprises a portion of said bottom surface.

14. The container of claim 13 wherein said sump has a portion occupied by said diptube and a portion unoccupied by said diptube below which said ultrasonic level sensor is positioned.

15. The container of claim 14 wherein said bottom surface of said external surface has a generally concave downward curvature from said side surface.

16. The container of claim 15 wherein said sump is below said generally concave downward curvature.

17. A method for determining the level of high purity chemical in a container of high purity chemical having a metallic shell with an external surface comprising a top surface, a side surface and a bottom surface, a valved inlet, a valved outlet, an ultrasonic level sensor affixed to the external bottom surface of said shell for determining the amount of high purity chemical in said container and a diptube connected to said outlet through which high purity chemical can be dispensed from said container, a sump in said bottom surface into which a lower end of said diptube terminates, comprising; positioning said ultrasonic level sensor below said sump, generating ultrasonic waves in said high purity chemical in said container, sensing the reflection of said generated ultrasonic waves by said sensor, and generating a signal proportional to said reflection.

18. The method of claim 17 wherein said sensing senses the high purity chemical in said sump.

* * * * *